United States Patent
Pool

[15] 3,643,368
[45] Feb. 22, 1972

[54] SLIDING SINKER BAIT CARTRIDGE

[72] Inventor: Samuel T. Pool, P.O. Box 1102, Sacramento, Calif. 70737

[22] Filed: Feb. 27, 1969

[21] Appl. No.: 802,901

[52] U.S. Cl. ........................................................... 43/41.2
[51] Int. Cl. ...................................................... A01k 97/04
[58] Field of Search ................................ 43/41.2, 41, 43.11

[56] References Cited

UNITED STATES PATENTS 2,140,724   12/1938   Stefan ..................................... 43/44.9

*Primary Examiner*—Warner H. Camp
*Attorney*—Edward Brosler

[57] ABSTRACT

A sliding sinker assembly for bottom fishing, comprising a cartridge in the form of a hollow tube open at one end and having a line passage through a wall at its other end, the tube being adapted to house live bait for casting, and having an overall specific gravity greater than the water in which it is to be used.

4 Claims, 4 Drawing Figures

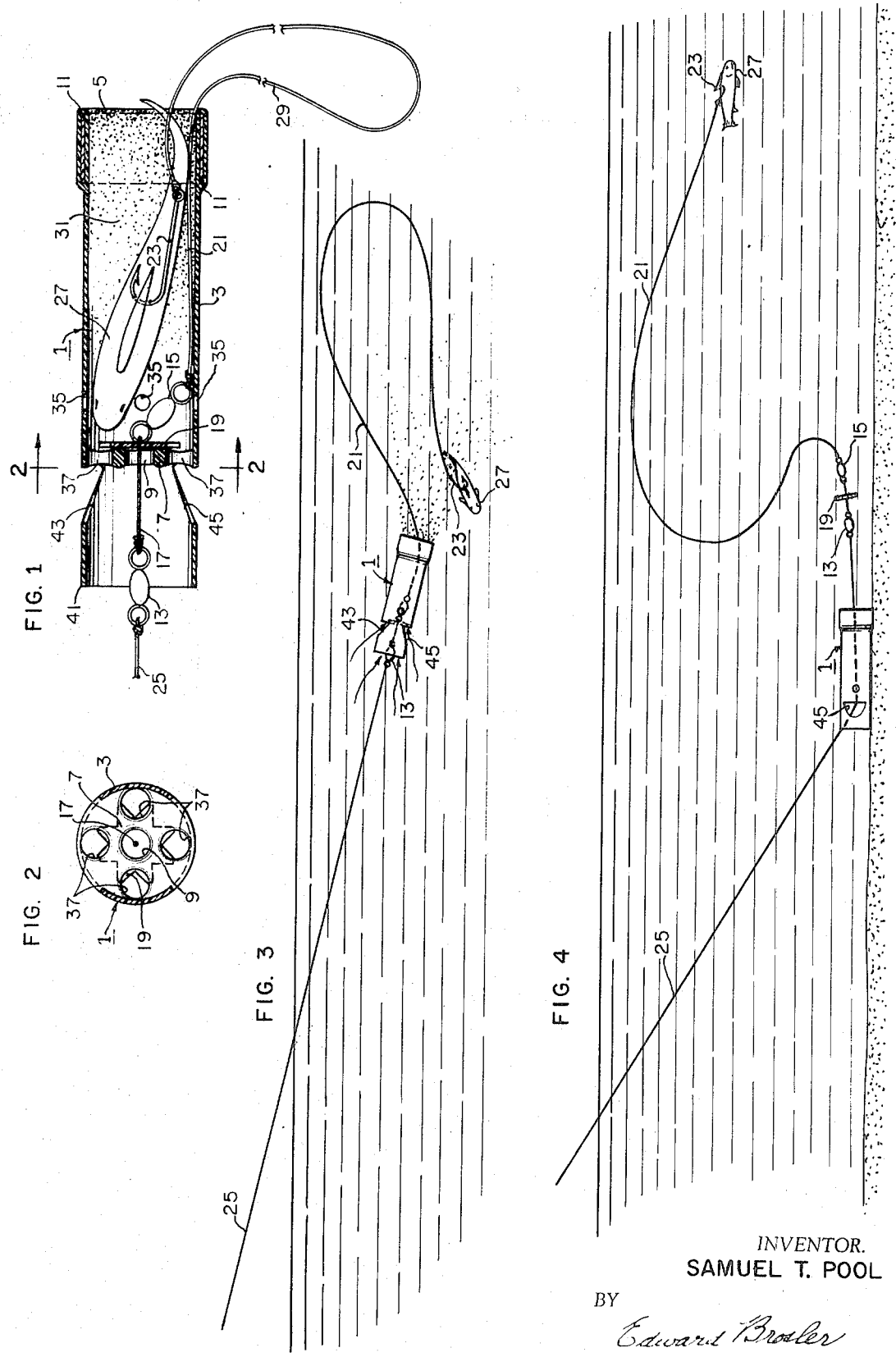

SLIDING SINKER BAIT CARTRIDGE

My invention relates to fishing equipment and more particularly to a sliding sinker assembly for bottom fishing.

A conventional type sliding sinker arrangement usually involves a lead weight having a longitudinal passageway therethrough for the line, leading to the leader and the baited hook. Upon taking the bait, the line can slide through the sinker, thus affording a fish a certain degree of freedom in its movement through the water.

Such conventional type sliding sinker, does not lend itself too well for casting purposes for the bait is secured to a hook which is dangling free in space, and any attempt to impart a vigorous cast to the sinker in hopes of carrying the baited hook a substantial distance, is more than apt to dislodge the bait, and if the bait be live such as a minnow, such sudden exposure of the minnow to the resulting centrifugal force, is apt to maim or kill it, if it is not otherwise dislodged in the process of casting.

Among the objects of my invention are;

1. To provide a novel and improved sliding sinker assembly;
2. To provide a novel and improved sliding sinker assembly which may carry bait to safety;
3. To provide a novel and improved sliding sinker assembly which has provision for housing the bait when casting, and automatically freeing the same from the sinker, after entering the water;
4. To provide a novel and improved sliding sinker assembly which permits of exceptionally long casts of bait with safety; and
5. To provide a novel and improved sliding sinker assembly which minimizes the probability of snagging on objects located along the bottom.

Additional objects of my invention will be brought out in the following description of a preferred embodiment of the same, taken in conjunction with the accompanying drawings wherein, FIG. 1 is a view in section through a sliding sinker assembly of the present invention, loaded and ready for casting;

FIG. 2 is a view in section taken in the plane 2—2 of FIG. 1;

FIG. 3 is a view depicting release of the bait following a cast; and

FIG. 4 is a view depicting the final rest position of the sinker following release of the bait.

Referring to the drawing for details of my invention in its preferred form, the same comprises a cartridge 1 in the form of a tube 3 having an open end 5 and a wall 7 at its opposite end, where it is provided with an axial line passage 9, the overall specific gravity of the tube being greater than that of the water in which it is to be used. Since salt water has a specific gravity just slightly above that of fresh water the specific gravity of which is one, the overall specific gravity, for practical purposes, should exceed that of salt water.

Accordingly, the same may be formed of material such as fiberglass, and in the preferred form of the invention, the open end of the tube is weighted, as by the inclusion of a ring 11 of metal such as lead, molded into the body of the tube at the open end of the tube, in the fabrication of the same. This, as will subsequently be seen, contributes to various distinct advantages in the use of the cartridge, which cartridge is of a size to comfortably house bait to be used, and particularly live bait such as minnows.

In preparing the sliding sinker for use, a pair of swivels 13, are connected by a short piece of line 17 extending through the line passage 9 in the end wall of the cartridge, the passage 9 being of a diameter exceeding that of the swivels. A disc 19 between the end wall and that swivel 15 within the cartridge, serves to block movement of the latter swivel through the line passage in the end wall.

A leader 21 supporting a hook 23, is tied to the swivel 15 while a line from the pole, is tied to the swivel 13.

In loading the cartridge, preparatory to a cast, a minnow 27, if live bait is to be used, is affixed to the hook and inserted into the cartridge through the open end thereof, leaving excess leader hanging as a loop 29 outside of the cartridge. Following insertion of the minnow, the cartridge is packed with wet sand 31 which, as one function thereof, will serve to keep the minnow moist and therefore alive, until the cartridge ultimately reaches the water in response to a cast.

During a cast, the weight 11 should be sufficient to cause that end of the cartridge to lead, while the wet sand packing serves, as an added function, to seal the weighted end against air flow into the cartridge which might otherwise upset stable flight and cause the cartridge to tumble.

Upon reaching the water, release of the bait may be achieved by the fisherman at any moment of his choice, either during settling of the cartridge or after it has come to rest on the bottom. Toward this end, I provide a plurality of openings 35 in the wall of the cartridge near the end wall 7 thereof, and in addition to this, I also provide a plurality of openings 37 in the end wall about the line opening. A few tugs on the line, will cause water to surge through such openings and bring about a prompt release of the contents of the cartridge, sooner than otherwise.

Following release of the bait, the bait, if live, is free to swim around within the limits permitted by the leader, and when such bait is taken by a fish, the line is free to slide through the sinker to the extent permitted by the fisherman in charge of the pole.

To the wall end of the cartridge, I prefer to add a cylindrical tail extension 41, such extension being notched at diametrically opposite locations to provide tail side openings 43 and 45. Such tail extension not only contributes to stability of the cartridge in flight, but in conjunction with the weight 11 at the open end of the cartridge, it materially aids in minimizing snagging of the cartridge against objects on the bottom during retrieval of the cartridge.

Upon setting the hook and reeling in the line, for example, the angle of the line coupled with the flow of water through the tail extension, and out through the side openings 43 and 45, will cause a lifting component on the tail end of the cartridge, which, because the open end is weighted, will result in a lifting of the tail end about the weighted end as a pivot. The more nearly vertical position thus assumed by the cartridge during retrieval will tend to minimize snagging of the sinker against obstacles on the bottom.

While the sliding sinker of the present invention might be cast with a rod, much more effective results, both as to distance of cast and preservation of the bait, may be realized through the use of a casting device forming the subject matter of my copending application for Bait Casting Apparatus, Ser. No. 649,198 filed June 27, 1967 and now Pat. No. 3,494,061. Such casting device involves a casting handle terminating in a split curved tube from which the loaded cartridge is cast, the curvature of the tube serving to minimize the effect of centrifugal force on the contents of the cartridge, while being cast and in flight. With such casting device, casting distances of the order of 225–276 feet have been achieved for light weight bait, when employing a cartridge of the present invention.

From the foregoing description of my invention in its preferred form, it will be apparent that the same fulfills all the objects attributed thereto, and while I have illustrated and described the same in considerable detail, it will be apparent that the same is subject to alteration and modification without departing from the underlying principles involved, and I accordingly do not desire to be limited in my protection to these specific details illustrated and described, except as may be necessitated by the appended claims.

I claim:

1. A sliding sinker assembly comprising a cartridge in the form of a hollow tube, said tube being open at one end and at its opposite end having an end wall with a substantially axial passage therethrough, the tube having an overall specific gravity greater than that of the water in which used, said end wall having openings about said axial passage.

2. A sliding sinker assembly in accordance with claim 1, characterized by an open cylindrical extension to said tube at the wall end.

3. A sliding sinker assembly in accordance with claim 2, characterized by said cylindrical extension as having side openings.

4. A sliding sinker assembly comprising a cartridge in the form of a hollow tube, said tube being open at one end and at its opposite end having an end wall with a substantially axial passage therethrough, the tube having an overall specific gravity greater than that of the water in which used, said tube having openings in the side wall thereof adjacent said end wall.

* * * * *